(12) United States Patent
Bauer et al.

(10) Patent No.: US 8,370,454 B2
(45) Date of Patent: Feb. 5, 2013

(54) RETRIEVING A REPLICA OF AN ELECTRONIC DOCUMENT IN A COMPUTER NETWORK

(75) Inventors: Daniel N. Bauer, Birmensdorf (CH); Paul T. Hurley, Kilchberg (CH); Marcel Waldvogel, Stein am Rhein (CH)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 10/563,071

(22) PCT Filed: May 7, 2004

(86) PCT No.: PCT/IB2004/001604
§ 371 (c)(1),
(2), (4) Date: Jun. 14, 2006

(87) PCT Pub. No.: WO2005/001713
PCT Pub. Date: Jan. 6, 2005

(65) Prior Publication Data
US 2006/0271530 A1    Nov. 30, 2006

(30) Foreign Application Priority Data
Jun. 30, 2003 (EP) .................................... 03014829

(51) Int. Cl.
*G06F 15/16* (2006.01)
(52) U.S. Cl. .......................................................... 709/218
(58) Field of Classification Search .................. 709/218; 715/234; 103/218
See application file for complete search history.

(56) References Cited

U.S. PATENT DOCUMENTS

| 5,832,487 | A  | * | 11/1998 | Olds et al. ............................ 1/1 |
| 5,963,944 | A  | * | 10/1999 | Adams ................................. 1/1 |
| 6,070,191 | A  | * | 5/2000 | Narendran et al. ............ 709/226 |
| 6,638,314 | B1 | * | 10/2003 | Meyerzon et al. ............. 715/234 |
| 7,277,881 | B2 | * | 10/2007 | Imaichi et al. ..................... 707/3 |
| 7,660,853 | B2 | * | 2/2010 | Scott et al. ..................... 709/205 |

FOREIGN PATENT DOCUMENTS

JP    2002-197002 A    7/2002

OTHER PUBLICATIONS

Marcel Waldvogel, Secure Distributed Document Storage Through Peer-to-Peer Technology, Jan. 2003, MSR Cambridge, pp. 1-24.*
Roberto Rinaldi at al., Routing and Data Location in Overlay Peer-to-Peer Networks, Jul. 2002, IBM Research, pp. 1-91.*
Leanne Guy et al., Replica Management in Data Grids, Jul. 2002, CERN, European Organization for Nuclear Research, pp. 1-20.*
Kavitha Ranganathan et al., Improving Data Availability through Dynamic Model-Driven Replication in Large Peer-to-Peer Communities, 2002, CCGRID '02, pp. 1-6.*

(Continued)

*Primary Examiner* — Krista Zele
*Assistant Examiner* — Esther Benoit
(74) *Attorney, Agent, or Firm* — Michael J. Buchenhorner; Vazken Alexanian

(57) ABSTRACT

There are introduced ways for retrieving or depositing a replica of an electronic document in a computer network. After having selected at least one replica number, a given function is applied. The function requires as input the replica number and a document identifier. The function returns as a result at least one entity identifier, each entity identifier representing an entity in the network that might provide the replica. In a next step, a document related request is addressed to at least one of the identified entities.

23 Claims, 3 Drawing Sheets

OTHER PUBLICATIONS

Lili Qiu et al., On the Placement or Web Server Replicas, 2002, ACM, pp. 1-10.*

Simple Load Balancing for Distributed Hash Tables; John Byers, Jeffrey Considine, Michael Mitzenmacher; Feb. 29, 2003; pp. 80-88.

Chord: A Scalable Peer-to-peer Lookup Service for Internet Applications;Ion Stoica, Robert Morris, David Karger, M. Frans Kaashoek, Hari Balakrishnan; MIT Laboratory for Computer Sciences; pp. 149-160.

Wide area Cooperative Storage With CFS; Frank Dabek M. Frans Kaashoek, David Karger, Robert Morris, Ion Stoica; MIT Laboratory for Computer Sciences. pp. 202-215.

Ion Stoica, Robert Morris, David Karger, M. Frans Kaashoek, Hari Balakrishnan, "Chord: A Scalable Peer-to-peer Lookup Service for Internet Applications," SIGCOMM '01, Aug. 27-31, 2001, San Diego California.

John Byers, Jefferey Considine, and Michael Mitzenmacher, "Simple Load Balancing for Distributed Hash Tables," IPTPS 2003, LNCS 2735, pp. 80-88, 2003.

Roberto Rinaldi and Marcel Waldvogel, "Routing and Data Location in Overlay Peer-to-Peer Networks," Jul. 8, 2002, Figs. 1 and 2 in p. 23.

Frank Dabek et al., "Wide-area Cooperative Storage with CFS," 2001, pp. 6 and 7.

* cited by examiner

RETRIEVING A REPLICA OF AN ELECTRONIC DOCUMENT IN A COMPUTER NETWORK

CROSS REFERENCE AND PRIORITY

This application filed under 35 USC 371, is cross-referenced with, and claims priority from, International Patent Application PCT/IB 2004/001604 filed on May 7, 2004, and published in English with Publication No. WO 2005/001713 on Jan. 6, 2005, under PCT article 21(2), which in turn claims priority of EP Application No. 03014829.0, having filing date of 30 Jun. 2003.

FIELD OF THE INVENTION

The present invention relates generally to replica access in a computer network. More particularly, the present invention relates to retrieving and/or depositing a replica of an electronic document in a computer network.

BACKGROUND OF THE INVENTION

Instant access to electronic documents and data becomes increasingly more critical for day-to-day business operations. As a result, storage needs to be reliable and resilient to failures, including localized physical damage. Distributed, replicated storage over a computer network seems the only way out.

Unfortunately, today's distributed/replicated systems either require full, identical replication between the computing entities involved which typically are at least two data centers in different locations, or require in the case of distributed storage, a centralized controller keeping track of the replica distribution. Anyone who is to access more than one replica needs to either know the full list of replicas or needs to have access to a directory service which returns this information, either globally—for all documents—or on a per-document basis.

Distributed storage becomes increasingly more important, as existing inexpensive machines can be used to serve content. With the advent of distributed hash table (DHT) technology, self-organizing storage networks have become feasible and have raised significant interest in the community. Sitting "on top" of the Internet, these scalable overlay networks use the transport capabilities of the underlying network, but add value. DHT technology provides a mapping from resource IDs to hosts (D-->H) that is typically preceded by a mapping from resource name to resource ID (N-->D). This is achieved using minimal routing information in each node. DHTs generally are also prepared to deal with changes in host availability and network connectivity.

DHTs come in a variety of routing flavors, but share the properties that messages are transported on a hop-by-hop basis among constituent nodes of the overlay network. Each hop knows how to get closer to the destination, until it finally reaches the node that claims the requested ID as its own and acts according to the request.

Some of the DHTs operate based on intervals ring topologies, such as described in "Chord: A Scalable Peer-to-peer Lookup Service for Internet Applications", Ion Stoica et al., Proceedings of ACM SIGCOMM 2001, August 2001, pages 149-160, some split hyperspaces into manageable chunks, as described in "A Scalable Content-Addressable Network", Sylvia Ratnasamy et al., Proceedings of ACM SIGCOMM, September 2001, or "Efficient Topology-Aware Overlay Network", Marcel Waldvogel and Roberto Rinaldi, ACM Computer Communications Review, January 2003, Volume 33, Number 1, pages 101-106, whereas others implement a rootless tree, such as described in "Pastry: Scalable, distributed object location and routing for large-scale peer-to-peer systems", Anthony Rowstron and Peter Druschel, IFIP/ACM International Conference on Distributed Systems Platforms (Middleware), November 2001, pages 329-350, or "Tapestry: An Infrastructure for Fault-tolerant Wide-area Location and Routing", Ben Y. Zhao et al., University of California, Berkeley, UCB/CSD-01-1141, April 2001.

Many of these DHT systems are able to exploit the locality of the underlay network. Locality aspects are typically separated into geographic layout and proximity forwarding categories adapted from "Exploiting Network Proximity in Distributed Hash Tables", Miguel Castro et al., International Workshop on Future Directions in Distributed Computing (FuDiCo), edited by Ozalp Babaoglu and Ken Birman and Keith Marzullo, June 2002, pages 52-55.

"Accessing Nearby Copies of Replicated Objects in a Distributed Environment", C. Greg Plaxton et al., ACM Symposium on Parallel Algorithms and Architectures", 1997, pages 311-320, shows another approach to locality patterns.

An approach of linking DHTs and caching is shown in "OceanStore: An Architecture for Global-Scale Persistent Storage", John Kubiatowicz et al. Proceedings of ACM ASPLOS, November 2000. There, queries passing along the DHT are redirected by Attenuated Bloom Filters (ABF), when there is a high probability that a document cache can be found along that route. Besides the chances for false positives despite continuous ABF update traffic, there is no way for the document originator to address selected replicas when the need arises.

"INS/Twine: A Scalable Peer-to-Peer Architecture for Intentional Resource Discovery", Magdalena Balazinska et al., Pervasive 2002—International Conference on Pervasive Computing, August 2002, shows an example of a resource discovery/directory service on top of a DHT.

US20020114341A1 presents a peer-to-peer enterprise storage, which uses a centralized controller/coordinator.

Applicant's U.S. Pat. No. 6,223,206 discloses a method and system for load balancing by replicating a portion of a file being read by a first stream onto a second device and reading the portion with a second stream capable of accessing. This prior art deals with a completely centralized system.

US20030014523A1, US20030014433A1, and US20030014432A1, each introduces a storage network data replicator. There are algorithms disclosed on how to replicate from one instance to the other. It is described which existing replica to select as a source for further replication.

U.S. Pat. No. 6,467,046, and EP 807 885 B1 both show a system and a method for automatically distributing copies of a replicated database in a computer system. Hosts and disks for determining replica placement are enumerated in order to improve reliability.

U.S. Pat. No. 5,815,649 illustrates a distributed fault tolerant digital data storage subsystem for fault tolerant computer system. Multiple redundant computers are used as a front-end to multiple redundant disks, basically as a network RAID (Redundant Array of Inexpensive Disks).

According to U.S. Pat. No. 6,470,420, a method is proposed for designating one of a plurality of addressable storage devices to process a data transfer request. A client multicasts a single request to all replicas and they cooperatively select the one to reply.

WO 03/012699 A1 shows systems and methods for providing metadata for tracking of information on a distributed file system of storage devices. Metadata are used to locate the files In U.S. Pat. No. 6,163,856 a method and an apparatus are shown for file system disaster recovery.

According to another applicant's patent U.S. Pat. No. 5,897,661, there is illustrated a logical volume manager and a corresponding method for having enhanced update capability with dynamic allocation of storage and minimal storage of metadata information. Metadata replication is provided, which is limited to those storage providers who have a need to know.

In WO 02/093298 A3, a modular storage server architecture is described with dynamic data management. This document shows replication according to locality access patterns and hierarchical storage management.

According to US20030028695A1, a producer/consumer locking system for efficient replication of file data is shown which provides locking between concurrent operations.

According to U.S. Pat. No. 5,588,147, a replication facility is described, which uses a log file mechanism to replicate documents.

Despite the work done on replication and distributed storage, there currently is a lack of replication mechanism on top of the completely distributed technology which does not suffer from the presence of single points of failure. As replicas not only improve availability, but may also balance load, there have been distributed mechanisms also for the purpose of caching. Besides reliability, caching systems also pose an update problem: As it is not clear, where information is cached, a cache may become stale, if it does not continuously track the status of the original location. This poses a severe challenge in scalability, undoing the off-loading, caching provides.

Hence, it is desirable to provide a mechanism for managing replicas in a computer network, which mechanism is reflected in appropriate methods, computing entities and computer program elements for retrieving and/or depositing replicas in a computer network.

SUMMARY OF THE INVENTION

The present invention provides a method for retrieving a replica of an electronic document in a computer network. At least one replica number is selected and a given function is applied. The function requires the replica number and a document identifier associated to the electronic document as input. By applying the function k times with k different replica numbers as input, k entity identifiers are determined, wherein each entity identifier represents a computing entity in the network that might provide the replica. k is an integer number equal to or greater than 1. Then, a document related request is addressed to at least one of the identified entities.

This method is preferably automatically executed on a retrieving computing entity with access to the network.

According to another aspect of the present invention, there is provided a method for depositing a replica of an electronic document in a computer network. Again, a replica number is selected and a given function is applied, the function requiring the replica number and a document identifier as input. The output of this function is an entity identifier, the entity identifier representing a computing entity in the network, on which a replica with the chosen replica number can be deposited. The identified entity is then addressed for replica depositing or amending purposes. This method might also be used for depositing document related amendments.

This method is preferably executed on a depositing or amending computing entity with access to the network.

The idea of this approach is that replicas of an electronic document can only be stored at predefined addresses in a computer network. Such addresses are also called entity identifiers in the present context. The addresses are predefined by a function which provides for each replica number per document an address associated to a computing entity where the particular replica can be found or can be stored.

In a preferred embodiment, the function is a pseudo-random hash function, where each address/identifier is mapped to one of the machines/entities in the network using a distributed hash table.

By means of this function, replicas cannot randomly be added or deleted anywhere in the network. Replicas can only be accessed or deposited at very defined locations/entities in the network, which entities are determined by applying the function with a replica number as input. Nevertheless, in case of applying a pseudo-random hash function, the pseudo-random property of the hash function assures that the replicas will be evenly distributed. However, other replicas can be disposed on entities in the network that follow another rule or function. The replicas deposited by means of the function can then also serve as a fallback solution for e.g. a centralized management system in case this system has a break down.

The function provides information for each electronic document at which entities in the network replicas can be found or at which entities in the network replicas can be deposited. For supporting this function, preferably a numbering system introduces replica numbers for each document to be retrieved or to be stored, the replica numbers being preferably in a range between 1 and N, with N characterizing in this case the highest replica number as well as the maximum number of replicas allowed. After having a document identifier y and a replica number x for this document identifier selected, the function then determines the entity identifier indicating the entity that is chosen for replica number x of document y. In a writing process, replica x of document y can then be sent to this entity and stored at this entity. In an access process, replica number x of document y can then be found at this particular entity, but not necessarily must be found there: There might not have been a need so far to have replica x of document y deposited at the associated entity for the reason that e.g. so far a lower number of replicas than x was sufficient to serve requests from retrieving entities.

Replicas of a document can only be retrieved at special addresses in the network determined by the function, provided that the function is the same for depositing replicas of the same document.

By preferably setting a limit for the numbers of replicas to be allowed in the network, retrieval processes are optimized since the retrieving entity has a limited field of replica numbers to base computations on and to look into if needed. By setting no or an excessive maximum number of replicas, there might be a loss in retrieval time by trying to access entities where actually no replicas are stored, since no one used this entity ever before for storing a replica with a very high number.

With respect to the methods proposed, it is understood that there is no difference in terminology between the original document itself and any replica. The original document itself is preferably stored under any replica number and therefore might be addressed under this replica number.

The underlying network might be a peer-to-peer network or a hierarchical network.

An electronic document might be any sort of electronic file or data or even data base, copies of which might be stored as replicas at different locations in the computer network. An electronic document as presented herein might also be an active resource, such as a computer program that will perform a stored action when accessed, or might also be a fragment of an electronic file such as a storage unit, a sector or a cluster of sectors. Replicas might be stored permanently at very specific locations e.g. for back-up purposes. Or they might be stored temporarily, e.g. for caching purposes, reducing the load on the network or other replicas, including the original document store, in particular when many users have a need to access the underlying document. The invention supports distributed storage applications or document repository storage applications, as well as distributed computing applications. Therefore, it is preferred to have more points of access than only the original resource by establishing replicas over the network to provide more computing capacity at the storing entities as well as more network capacity in favor of the users. Replicas might also be beneficial from a single user point of view who wants his electronic documents accessible on many different computing entities like e.g. a laptop, a handheld, a mobile phone, or a desktop computer. The invention extends to all these applications of replicating electronic documents, but is not limited to.

The capabilities of the entities described in connection with the invention depends on the intended use. Generally, a computing entity might be any unit being able to access the network and communicate over the network. Some of the entities might primarily serve as a deposit location for documents/replicas and are thus prepared to store huge amounts of data. Such entities might in particular be server computers. However, every other computing entity comprising an interface to the network and any sort of storage might serve as an entity for providing replicas. Retrieving entities might be embodied as client computers or any other type of computing entity, such as e.g. referenced above, or might also be computers of a document administrator. Preferably, a computer can do both, retrieving and depositing replicas.

According to the method of retrieving—i.e. locating—a replica of an electronic document, addressing the identified entity that might provide the replica can be performed in different ways. The request addressed to the entity might only make the addressed entity look up whether this replica is actually available and tell the result to the retrieving entity. In another embodiment, the request might also comprise the demand to send the replica to the retrieving device immediately, or to add or to amend or to update or to modify data delivered together with the request to the replica at the identified entity.

In case of depositing a replica at an identified entity, the request might only trigger a response whether the addressed entity is ready for storing a replica, and initiating an internal check therefore at the addressed entity. However, the request might also include the replica itself ready to be stored immediately at the addressed entity.

From a global view, the method for retrieving replicas makes the client—also called retrieving entity—send only a small number of messages to locate a replica. As can be seen from embodiments below, the client might locate a close or even the closest replica. For this to work out, the selection of replicas is preferably limited. Because the replicas can thus be enumerated and directly addressed, it becomes possible for a client to find the document quickly. However, it is also beneficial for the document owner to find all replicas quickly, in case the document has been or has to be updated or contents of the document have to be verified or otherwise processed.

Furthermore, each replica needs to store only the tuple of a document ID and a document content. A document content can be the content of the document itself, such as e.g. text or graphics, but may instead also be a (set of) pointers to the node(s) that actually store the document. and [a set of] replica index or replica entity ID. In case the same entity can be responsible for multiple replicas of the same document, which can be the case as a function such as a hash function randomly distributes the entity identifiers such that two or more of them may fall within the range covered by a single node, an entity and thus the replica might provide additional information in form of a replica index or replica entity ID which makes distinguish different replicas on the same entity.

Taking the preferred embodiment of a limitation of replica numbers into account, the selection of a replica number based on which the function can determine the identifier of the entity that is associated to this particular replica number of the chosen document can be handled in different ways. The selection can be a random selection of k replica numbers. However, the selection can also cover all N replica numbers, wherein N is the maximum number of replicas, and the preferred range of numbers might for example be [1 ... N] or [0 N−1]. In this preferred embodiment, the given function is applied k=N times in order to determine k entity identifiers which might provide access to a replica of the relevant document.

This embodiment gives full freedom to the retrieving entity to access a maximum number of entities each of which might provide a replica, or to select some identified entities or only one identified entity to address to. A selection scheme might follow an evaluation of the different identified entities.

However, when resources are limited or when N is a big number, another approach might be preferred: Only k replica numbers might be chosen out of a maximum N replicas, with k<N. Consequently, only k entity identifiers are delivered by the function for determining such entity identifiers.

This approach is beneficial for limiting the quantity of data which is the quantity of entity identifiers and in the end the quantity of entities which might be considered worth for addressing.

Preferably, k might be chosen <=5. This represents a reasonable range of entities which might be addressed for retrieving a replica, in particular when all the identified entities are directly addressed without selecting a subset of entities for this purpose. The rationale for this strategy is explained below in more detail.

In another preferred embodiment k=1, and thus, in this approach there is only one addressee identified from the beginning and the request is addressed only to this one entity. In one embodiment, the replica number might be selected randomly. In another embodiment, the replica number is selected within the low numbers of the range of allowed replica numbers, provided that replicas are distributed over the network with ascending replica numbers. Thus, probability is increased to hit a replica at a first shot when looking for the replica at an entity which provides a replica with a low replica number. However, this replica might be located remote from the retrieving entity.

In a more parallel approach, the document related request is addressed to all identified entities. This embodiment reflects the fact, that not necessarily all identified entities really have to have the requested replica available. Note that the entity assigned to a specific replica number by way of the function only determines the location where a replica with this replica number has to be deposited if this replica number is used for depositing the replica. However, there is no necessity that any entity in the network had a need so far to really deposit a replica with this number at this particular location/entity, since e.g. the number of replicas so far in use were sufficient to cover the demand in the past.

However, when addressing a request to more than one identified entity, it is more likely to receive information from at least one of the addressed entities that the replica in question is available and ready for a download.

In another preferred embodiment, only selected ones of the identified entities are addressed with the document related request. This embodiment allows a qualified selection of identified entities for addressing purposes. As the process to identify entities providing replicas of a document might not demand too much resources and thus be performed for the maximum N replica numbers or at least for a major part of, handling communication with many entities might be cumbersome and a waste in time and resources. In order to minimize the number of requests to be sent to identified entities, an evaluation scheme might be applied for determining only the most promising entities out of the identified entities. The evaluation whether an entity is considered to be promising can be based on different criteria.

In particular when intense communication to entities is not favored for some reason, an evaluation/selection process might end up in selecting only one preferred entity to address the document related request to.

A particularly preferred evaluation scheme can comprise a cost function for calculating a cost value related to an entity. Such a cost value might indicate the cost to address the entity and/or to communicate with this entity and/or to perform a download from this entity, wherein cost can be defined e.g. as time and/or resources needed and/or another parameter which indicates a preference or a drawback with regard to accessing the relevant entity. Preferably, the cost value is calculated for each of the k identified entities. In a next step, the to be addressed entities are selected from the identified entities according to the calculated cost values. Preferably, only entities are selected to be addressed that show a low cost value. A threshold might be introduced to determine the entities showing a low cost value. Or entities are selected which show the lowest cost values out of the number of evaluated entities.

In a preferred embodiment, the cost function might look up or derive cost values for the entities from a cost database. Such data base can be a local (e.g., cache), a centralized, or a distributed database.

Preferably when no other means are available to derive cost values for entities, such cost values can be directly derived from a communication with these entities. In a preferred embodiment, the identified entities are addressed and called to send a response, where for example the time between the issuance of the request and the arrival of the response at the retrieving entity is measured and translated into a cost value for the addressed entity. This cost value might be related to the location of the retrieving entity and the location of the addressed entity, as the more remote the addressed entity is located the longer the round trip time is. However, it might be reasonable to determine cost values in this way in advance, in particular before a replica representing a huge file is to be downloaded. Then it might be a more time saving approach to address a number of identified entities with short messages for cost estimating purposes than instead of starting immediately with the download from a randomly chosen identified entity, which by chance might provide a very slow download rate.

In general, a cost value can be represented by an absolute value for the entity in question or by a relative value taking the cost as cost related to the retrieving entity.

In case a "replica not available" response is received from each of the addressed entities, another entity is selected from the identified entities for addressing the document related request to. The "replica not available" response indicates that actually there is no such replica stored at the relevant entity.

Provided that in a network replicas are stored in ascending order of replica numbers, a "replica not available" response indicates that there is no replica stored at this entity with this particular replica number. In addition, one can derive from this system rule in place that there are no replica stored at entities anywhere in the network with these entities being assigned to any higher replica number than this particular one. This means that it is not promising to address entities that are expected to store replicas of the same document with higher replica numbers. Insofar it is preferred to select at least one entity to address a new request to from a set of entities that represent lower replica numbers than the replica number that failed. This helps tremendously to limit the amount of entities that are worth to be addressed in general.

As a direct result of repeatedly applying the above rule to all answers in turn, if more than one entity is accessed and all responses indicate a "replica not available", the lowest replica number out of these addressed replica numbers sets the upper limit for the new set of replica numbers from which another entity is selected to be addressed with the request.

Within this set of remaining entities, the next to be addressed entity/entities can again be selected according to their cost values. This means that within the set of remaining entities, it is again the entity/entities addressed in a further step that show the lowest cost in case low cost is the selection criteria. When in turn none of the responses on such request disclose an entity providing the requested replica, again the lowest replica number involved in these requests sets an upper limit for replica numbers which associated entities might be addressed in a further step.

A stepwise and iteratively applied exclusion of identified and addressed entities that cannot provide a replica and the conclusion that other entities with an assigned replica number higher than the already addressed ones, reduces the communication on the network for retrieving the replica on magnitudes.

However, wherein upon any indication from the addressed entity/entities that neither the replica is not available nor the replica is available there, one cannot derive that any other entities determined by higher replica numbers than the one that failed do generally not provide the replica in question. Consequently, such entities cannot be excluded from addressing further requests to. Only the addressed entity/entities can be excluded for now, as it may remain unreachable for at least the time of this query. Instead, it is preferred to address a request to another one of the remaining entities which is selected from the identified entities, and which preferably shows the next best cost value.

According to another embodiment of the invention, one or more most preferred entities are selected from the identified entities, and the document related request is addressed to each most preferred entity. In this embodiment, the addressed entities are selected according to their distance from the retrieving entity, where each most preferred entity shows a short distance from the retrieving entity, wherein a short distance can be defined either absolutely by applying a threshold or relatively by comparing the detected distances. E.g. when g entities are to be selected, it is preferred that the g entities are the ones showing the shortest distance with regard to the retrieving entity out of the identified entities. In some networks and in particular in some entity identifier notations, the location and consequently a distance measure can be derived from the associated entity identifier. Such a distance can be regarded as a cost value and the cost value can be used as criteria for the selection process.

Again, it is preferred in this embodiment that upon receiving a "replica not available" message from the addressed entity, at least one other entity is selected from a set of identified entities as a second best preferred entity for addressing the document related request to, this set of identified entities being limited to entities with corresponding replica numbers lower than the lowest replica number that is associated to the most preferred entity identifier/s. The second preferred entity is preferably selected from the set of identified entities according to its distance from the retrieving entity, wherein the closest distance is derived amongst the set of entities from the associated entity identifiers.

According to other aspects of the present invention, there are provided computer program elements comprising computer program code means which, when loaded in a processor unit of a computing entity, configures a processor unit to perform a method as claimed.

In addition, there is provided a computing entity for retrieving a replica of an electronic document in a computer network, comprising a control unit designed to perform a method for retrieving a replica of an electronic document in a computer network as specified above or as specified in any one of the claims 1 to 22.

And there is provided a computing entity for depositing a replica of an electronic document in a computer network, comprising a control unit designed to perform a method for depositing a replica of an electronic document in a computer network as specified above.

Advantages and embodiments described with reference to the methods for retrieving or depositing replicas on a computer network are also considered being beneficial respectively being embodiments for the herein before described computing entities and computer program elements.

BRIEF DESCRIPTION OF THE DRAWINGS

Preferred embodiments of the invention will now be described, by way of example, with reference to the accompanying drawings in which.

Different figures may show identical references, representing elements with similar or uniform content.

DETAILED DESCRIPTION OF THE DRAWINGS

Figure 1:
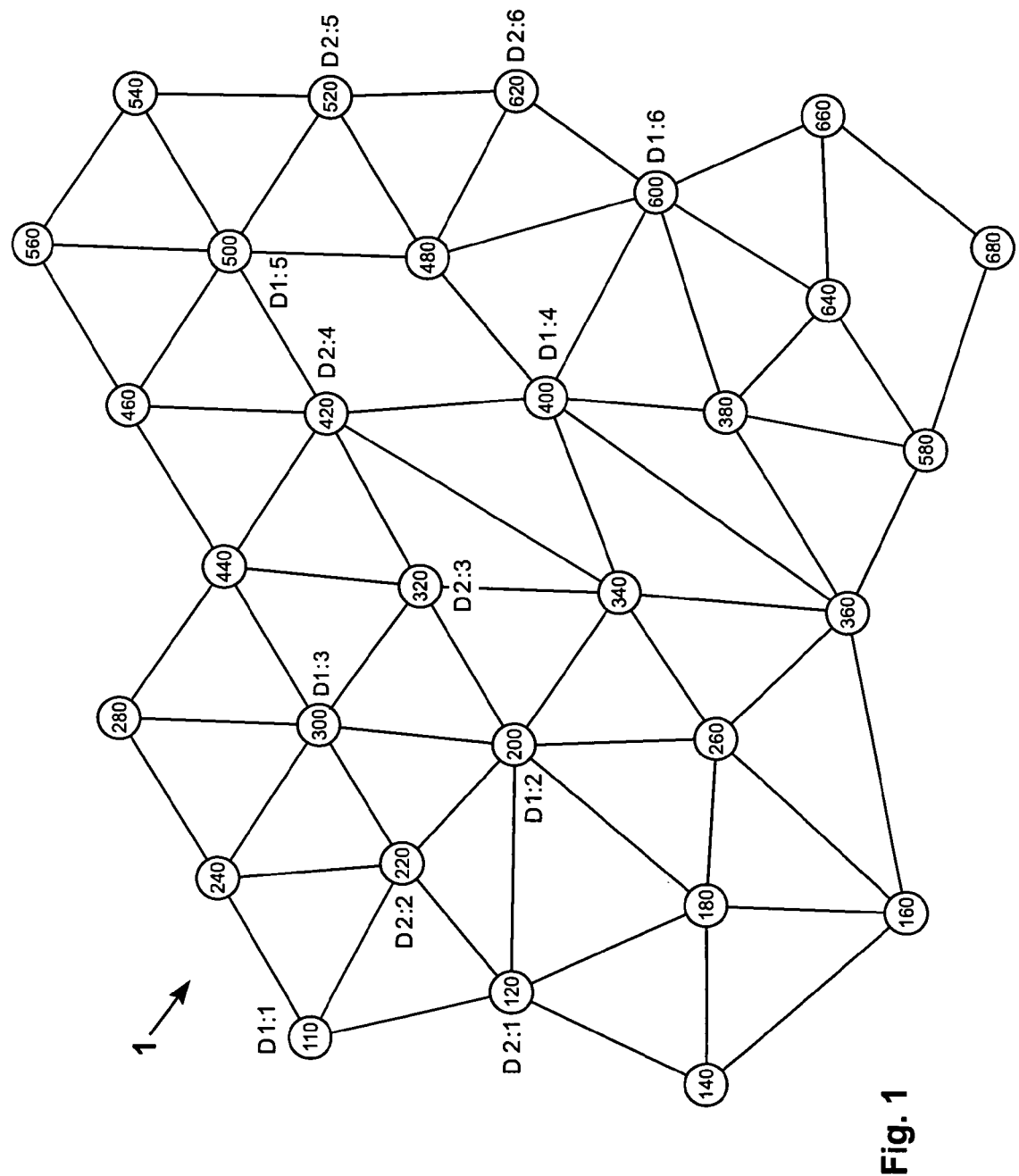
FIG. 1 shows a part of a network as part of a distributed storage.

FIG. 1 shows computing entities 100, 120, 140, 160, 180, 200, 220, 240, 260, 280, 300, 320, 340, 360, 380, 400, 420, 440, 460, 480, 500, 520, 540, 560, 580, 600, 620, 640, 660, 680—also called nodes—being part of a computer network 1. The numbers the computing entities are provided with are entity identifiers which in the end either are or represent addresses of the entities.

It is assumed that the document with the document identifier D1 is a very popular document. Therefore, there are many replicas of this document stored all over the network 1. A maximum number of replicas distributed over the network is N=6, where this number is chosen as a relatively small number for illustrating purposes. Hence, a system-wide maximum N replicas per document are provided. The following notation is introduced: D1:1 represents replica number 1 of document D1, D1:2, represents replica number 2 of document D1, and so on.

As can be derived from FIG. 1, the k=N replicas of document D1 are distributed over the network 1 at locations/entities with entity identifiers, 100, 200, 300, 400, 500, 600. On the other hand, it can also be derived from this FIG. 1 that another document D2 is also available in form of N=6 replicas for illustration purposes which are located at entities 120, 220, 320, 420, 520, 620.

Documents D1 and D2 are deposited over network 1 according to a function $$h(i,Dx)=100+(((x-1)*20)+((i-1)*100) \text{ modulo } 600)$$

with i being the replica number, and i=[1 ... N],
and Dx being a document identifier with x being a number 1, 2.

One of the entities shown in FIG. 1, or another entity outside the scope of the network shown in FIG. 1 has applied this function h(i,Dx) for depositing replicas of the documents D1 and D2, and actually has deposited every 6 replicas of each document over the network.

Only for illustration purposes, there might be other documents deposited over the network following e.g. a function like h(i, Dx)=100+((x*20+i*(120−20*x)−120) modulo 600), resulting in an overlap of depositing replicas of different documents for example at entity 300.

In more general words, for each document Dx, there is a number k of replicas that exist for Dx. These replicas are stored at address h(i, d), with 1<=i<k. h( ) is preferably implemented as a pseudo-random hash function. This means that each address is mapped to one of the machines in the network using the DHT.

Normally, the maximum number N of allowed replicas can be chosen very large, as the average number of the operations dominating the cost (i.e. actual requests) can be limited to log(N+1). For example, choosing N=1023 results in average 10 messages or less to locate the closest replica and initiate download.

A retrieving entity, which might for example be entity with the identifier 140, might now wish to access a replica of document identified as D1. Computing entity 140 has available the same function h(i, Dx)=100+(((x−1)*20)+((i−1)*100) modulo 600) for determining entities where replicas of document D1 might be available. When applying this function for all i replica numbers, retrieving entity 140 will get the entity identifiers 100, 200, 300, 400, 500, 600 as result.

Having determined these locations where a replica of document D1 might be available for download, retrieving entity 140 now applies a cost function. Knowing, that the entity identifiers increase from the right hand part of the network 1 to the left hand part of the network 1 at least when considering only the "hundreds" digit of the identifiers and being aware of the own location in the very right hand part of the network, the cost function applied by entity 140 might be a comparison of all the entity identifiers delivered by the function h(i,Dx). The result might be a relation of 100<200<300<400<500<600. According to this result, it can be derived, that the entity with identifier 100 shows the lowest cost value as being the first in the rank, and entity 600 showing the highest cost value as being the last in the rank. Translated into written language, the cost values indicate that entity identified as entity 100 is probably the closest one to retrieving entity 140. As retrieving entity is interested in a quick download, entity 100 seems the most cost efficient for communicating with and thus for a download.

As a consequence, the retrieving entity addresses a request to entity 100 on document D1 which entity 100 responds with a positive answer ("replica of D1 available here") or, in an alternate embodiment, straight with a transmission of the replica D1.

Figure 2:
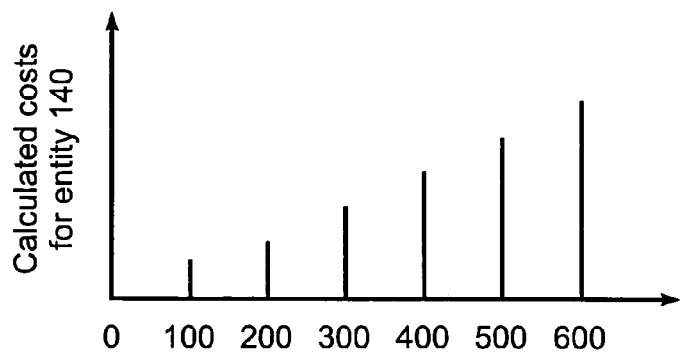
FIG. 2 shows a diagram of a cost function.

FIG. 2 shows a diagram of the costs associated to each identified replica of D1, after applying a cost function at entity 140. The costs are determined in relation to the location of retrieving entity 140 in the network and represent an evaluation of the distances to the retrieving entity 140 based on the knowledge of the network structure as explained above.

Figure 4:
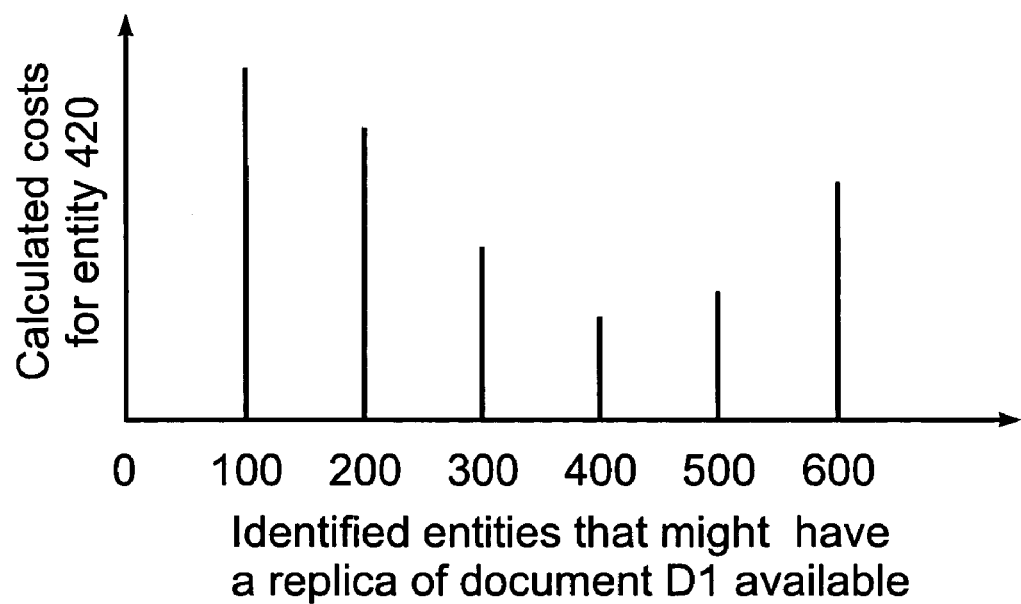
FIG. 4 shows another diagram of a cost function.

In another embodiment, it is assumed that entity 420 is now the retrieving entity that is looking for replicas of document D1 and that identifies entities 100, 200, 300, 400, 500, 600 as possible providers of such a replica. When applying the 420 entity immanent cost function, it delivers as result, that probably entity 400 is the closest entity to retrieving entity 420 to get the replica from. FIG. 4 shows a diagram of the costs associated to each identified replica of D1, after applying a cost function at entity 420. The costs are determined in relation to the location of retrieving entity 420 in the network and represent an evaluation of the distances to the retrieving entity 420 based on the knowledge of the network structure as explained above.

However, now only entities 100, 200, 300 can really provide a replica of document D1 as an administrator of document D1 might not have distributed replicas yet to the entities 400, 500 and 600 by not having applied the hash function for these replica numbers yet.

Hence, when retrieving entity 420 now sends a request to closest entity 400, entity 400 might now respond that there is no replica of document D1 available at entity 400. Requesting entity 420 now might try to address another request to entity 500 as being the next preferred and next close entity to get the replica from. However, given that the entities in the network are filled up with replicas by ascending replica number, it is apparent that when entity 400 cannot provide the replica number i=4, any replicas with higher replica numbers are not available at the assigned entities. Thus, any request directed now to another entity than entity 400 within the identified entities 100 to 600 has to be directed to an entity which might provide a replica with a replica number smaller than i=4. Thus, entities 100, 200, 300 may form the set of entities associated to replica numbers smaller than i=4 which actually might have a replica of document D1 stored. As entity 300 shows the lowest costs among the remaining entries, entity 300 may be approached next from retrieving entity 420 and may be approached with success. However, if even entity 300 would not have a replica of document D1 available, the set of entities to approached next is further limited. By applying this scheme in an iterative way, lots of communication to other entities can be saved.

As already touched above, some distributed hash tables (DHT) preserve locality, i.e., by knowing that two addresses are similar, one can conclude that the entities serving those addresses will be close-by as well. This property can be used to estimate the distance—as measured according to the metric used by the DHT—to another entity. A DHT supporting such a system is for example Mithos in "Efficient Topology-Aware Overlay Network", Marcel Waldvogel and Roberto Rinaldi, ACM Computer Communications Review, January 2003, Volume 33, Number 1, pages 101-106, which is hereby incorporated by reference. However, other cost functions can be applied. Such cost function can be either as part of the network itself or on top of it, or individual as part of each entity.

According to another embodiment of the invention, when a client wants to locate the document with ID d, it a priori only needs to know N, the maximum number of replicas and the hash function used. The process is then as follows:

1. r:=N
2. The client determines which of the nodes that would replicate the document would be closest, by checking the distance of the serving document for all possible values of the replica number, i ($1 \leq i < r$). It picks the one which is closest—assume this is node g—and asks it for the document. In a well-suited DHT, or augmented by an appropriate local database, this does not require sending any messages.
3. If the asked node replies with the document, everything is fine; else, r=g−1 and the algorithm continues at step 2 (caching the calculation of the distances is recommended).

This is a way to return the closest possible replica, as the search starts with the closest node. If it is in fact a replica, the closest replica was found. If it has not, all replicas numbered g or higher from the search can be excluded, as the replica allocation policy guarantees the replica numbers to be contiguous and starting from 1.

It is expected to stop after log N steps. As the hash function is pseudo-random, the closest node in each interval will on average be in the middle. Thus, an average of 50% of the candidate nodes can be excluded. It is guaranteed to make progress, as at least one node is always excluded. And it is guaranteed to find the document, if at least one replica (numbered 1) exists. No further information is required.

Thus, the retrieving method of this embodiment can be characterized as a randomized binary search from the perspective of the pivot selection. It can be extended to (k+1)-ary search, by concurrently probing the k closest nodes. Then, the retrieving node might not want to directly ask the identified and where applicable cost-selected nodes for the document, but only ask whether the node has it, in order to prevent multiple transmissions.

Back to FIG. 1, the parameters that are known and invariant system-wide are the maximum number of replicas N, and the hash function h( ) used.

The approach for retrieving and/or depositing replicas in a computer network as proposed can also be used as a backup system for a site- or organization-wide replicated networked storage system based on a centralized directory structure for replica management. In such a scenario, the directory server would provide a single point of failure. In this case, only a subset of the replicas need to be placed according to the above system. Other replicas could be placed as desired based on locality patterns (e.g. guaranteed off-site storage) or access patterns (e.g. close to the clients). Then, the data stored according to this invention would still be accessible even if the centralized directory would fail or become otherwise inaccessible. Even though performance might be reduced depending on the size and placement of the subset of replicas that are assigned according to the present invention, access to the data would still be guaranteed.

In very localized systems/networks—i.e. within a single building or site, where all systems are basically equally well accessible—, the distance function can be replaced by a random function, to achieve efficient load balancing.

According to another embodiment of the present invention, a cost function represented by a distance estimation function as described above and based on information that can be derived from entity identifiers themselves might not be available. Instead of selecting closest entities out of the entities identified as replica deposit, random entities might be chosen out of the identified entities and addressed. The response on such request may carry information such as replica load or round trip time which can help choosing the best match in case of multiple matches. This random selection in combination with a cost estimation does not guarantee to detect the closest node, however it may lead the retrieving entity to eventual location of a replica. A relatively large number k of addressed entities results in more probes and thus a higher probability for a close-by entity.

In case, a cost function like the distance estimation function as explained above is expensive, but anyway cheaper than sending a message to the entity, from the identified entities only a subset of entities might be chosen for having calculated their respective cost values. Then, the best entities from a cost value point of view are selected for sending a request to.

In both of the above embodiments, it is not necessarily needed to identify all N entities that might be in the possession of a replica. Instead, only a smaller number k<N of replica numbers might be selected for determining associated entities.

In case approached entities are unreachable or return "overload" messages which can be interpreted as "cannot currently serve document, please pick another replica" or where a time-out is reached after an approach, it is impossible to make an estimation whether the nodes do not have the replica available or whether they have it available but cannot deliver it currently for any reason. With regard to the method of depositing a replica, a possible return message can also indicate that the addressed entity should indeed carry a replica, but that insufficient storage is available. The algorithm would still work correctly, with minimal impact on its performance. So, if none of the addressed entities return either a commitment of the entity to send the document or an indication that they do not have the document, the search range for addressing further requests cannot be limited. Instead, the next best entities are selected from the current entity rang, e.g. using a cost estimation of any kind, and these entities are approached next.

Figure 3:
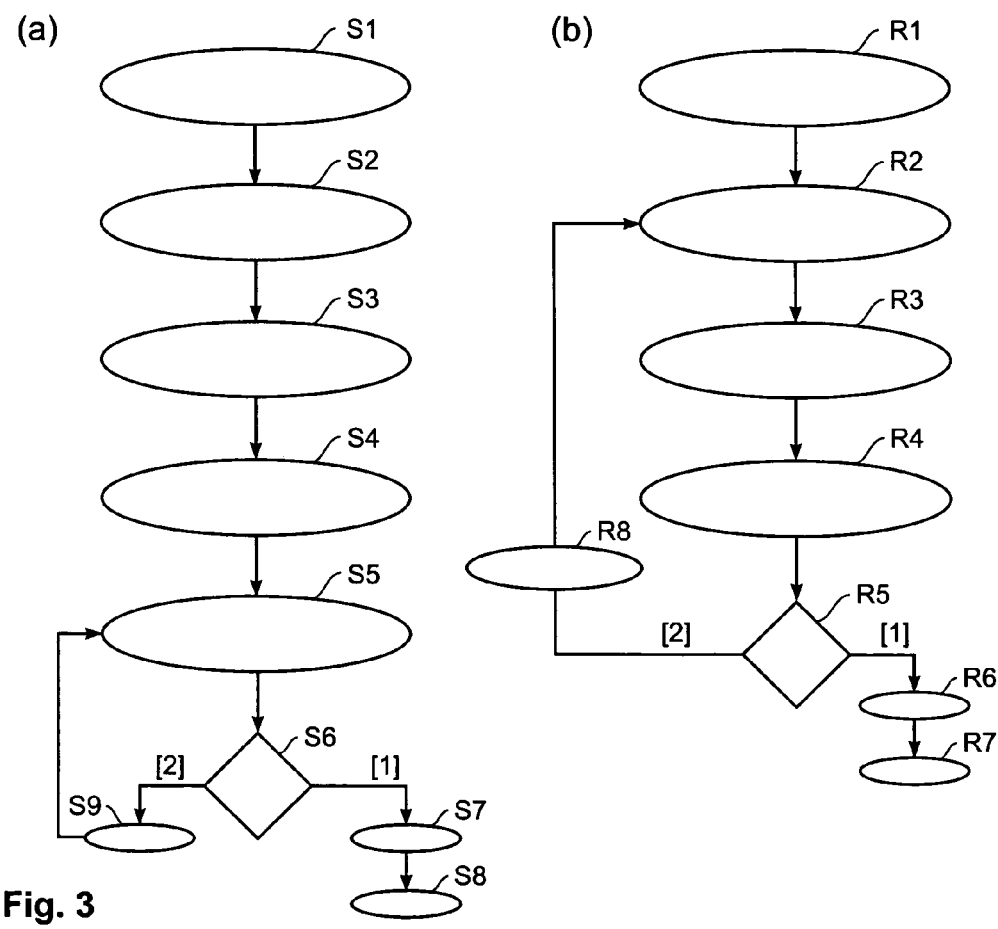
FIGS. 3a and 3b illustrate flow charts of methods of retrieving a replica in a computer network, in accordance with an embodiment of the present invention.

FIG. 3 shows two flow charts embodying the aspect of retrieving replicas according to the invention. FIG. 3a) shows a method for topology aware network, whereas FIG. 3b) shows a method for a non-topology aware network. Topology-aware in this context means that a location of an entity can at least be roughly derived from its address/identifier, or can be derived from additional, relatively inexpensive probes or measurements.

For both of the charts, the following notation is applied:
N, is the maximum number of replicas.
h(m, d), is a hash function on the replica number m and the document ID d
c(a), is a cost function giving the cost to address a
k, is the number of probes per step With regard to FIG. 3a), in step S1, r as the maximum valid number of possible replicas for the document is initialized to N. In step S2, a_m=h(m, d), forall m in [1, N] is calculated. In step S3, c_m=c(a_m), for all m in [1, N] is calculated. In step S4, k indices m_µm_k out of the set [1, r] are picked, such that the corresponding c_m_i are minimal. In step S5, the a_i addresses are probed. Optionally, the probes are terminated after only k-s answers. If, in step S6, any of the probes returned document availability [1], in step S7 the best probe/address is determined according to any metric, and in step S8 the replica is returned from this best address.

If in step S6 none of the addressed entities returned a document [2], then in step S9 r is set to min(m_i)-1 and the method is continued at step S4.

With regard to FIG. 3b), in step R1, r as the maximum valid number of possible replicas for the document is set to N. In step R2, k indices m__1 . . . m_k are randomly picked out of the set [1, r]. In step R3, the addressed a_i of the replicas to be probed by calculating a_i=h(m_i, d) are determined. In step R4, the a_i addresses are probed. The probing optionally terminates after only k-s answers in order not to waste time waiting for the last few answers, which may never come, as the addressed node may be down or unreachable. This may improve performance at the cost of not listening all nodes. It is unlikely that the nodes which have not been waited for will be good candidate replicas, as the reason that they are slow in responding is likely due to overload of the network or the replica itself.

If in step R5 any of the probes returned document availability [1], in step R6 the best probe/address is determined according to any metric, and in step R7 the replica is returned from this best address return the best. If none of the addressed entities returned a document [2], then in step R8 r is set to min(m_i)-1 and the method is continued at step R2.

In the following section, some more embodiments with regard to all aspects of the present invention are described.

In case a document related request is only sent to one of the identified entities according to the cost estimation, such entity might need a long time to respond in case the load at this machine is very high. Such addressing mechanism can be further improved by selecting at least one other additional entity amongst the identified entities in a random way and sending another request to this at least one more entity. This way, an entity that is close and thus selected to be addressed according to the introduced scheme but that is overloaded and will thus not respond or respond only very slowly can be detected and can automatically be offloaded by future queries, i.e. not being taken into account for future requests. On the other hand, the randomly selected entity might in such a case provide a requested response in due time without having to select new close by entities for addressing new request to.

According to another embodiment, the number of issued requests and thus search time can be restricted at the possibility to exclude a small set of nodes from the selection process. Thus, a sub optimum neighbor may be selected, or in the case of massive network outages combined with a very bad cost function, not all potential replicas may be searched. The expected performance is log(N) steps/requests to be sent out, where N is the maximum number of replicas. Yet, the worst case is N steps, namely, if the cost function is a monotonically decreasing function of the replica numbers. The effect of such a cost function is that each step will only eliminate a single potential replica, not half of them, as expected. The solution to this problem is to have a minimum guaranteed progress each step. A potential class of functions which can be used to guarantee a minimum of progress include:

Bound r (the window of potential probes) by at most N/base^(steps-delta), where base is the base of the exponent, such as 2; steps is the number of steps that have been performed so far, and delta is a worst-case rate. By choosing base=2, delta=2, you require at most delta additional steps, and your range will never be wider by more than a factor of base^delta of the expected case, assuming binary search (number of probes per step, k=1). Still, the quality of the node found is bounded by a factor of base. The quality factor is defined as follows: Given r_d actual replicas, order them by increasing cost. The unmodified (unbounded) search would always find the first (=best) of those. The modified case will find one which is ordered among the first r_d*(1-1/base) items, so it is never worse than the rd*(1-1/base) item.

"Simple Load Balancing for Distributed Hash Tables", J. Byers et al.,

International Peer-to-Peer Symposium (IPTPS), February 2003, illustrates that using two probes within a DHT is welcome as it distributes load better: An item is typically stored at the less loaded of two (or more) possible locations.

The invention claimed is:

1. A method for retrieving an electronic document in a computer network, comprising:
   determining a document identifier for the electronic document to be retrieved, wherein said electronic document has k=N replicas stored throughout the computer network, wherein N is a maximum number of replicas;
   wherein replicas are stored in ascending order of replica numbers at addresses predefined by a function which provides, for each replica number per electronic document, an address associated to a location entity where the replica can be found or can be stored;
   identifying the location entities where the replica for the electronic document might be stored by using a hash function that employs the replica number and the document identifier as input, wherein said hash function must be the hash function that was used to store the replicas of said electronic document; and
   performing iteratively (i=i+1) for each for each identified location entity until the replica is located:
      addressing a document related request to location entity (i), wherein location entity (i) has a set of replica numbers associated with it;
      receiving a positive response, indicating that the replica was located at location entity (i) for a particular replica number; and
      when receiving a negative response, indicating that there is no replica stored at location entity (i) for the particular replica number:
         setting the particular replica number associated with location entity (i) as an upper limit for a new set of replica numbers associated with a next location entity (location entity (i+1)) to be addressed with the document related request, wherein the new set of replica numbers represent lower replica numbers than the particular replica number that returned the negative response.

2. The method according to claim 1, wherein k<=5.

3. The method according to claim 2, wherein k=3.

4. The method according to claim 1, comprising:
   addressing the document related request only to one location entity from the identified location entities.

5. The method according to claim 1, comprising addressing the document related request only to one location entity from the identified location entities.

6. The method according to claim 1, further comprising:
   calculating a cost function for each of the location entities, the cost function providing a cost value as a result which indicates a cost to address the location entity.

7. The method according to claim 5 further comprising:
   calculating the cost function for each of the location entities, said cost function providing the cost value as a result which indicates the cost to address the location entity, wherein each location entity to be addressed is selected from the identified location entities due to an associated cost value.

8. The method according to claim 6, wherein the addressed location entities consist of at least one location entity showing a lowest cost value/s.

9. The method according to claim 6, wherein cost values for the addressed location entities are derived from communication with those location entities.

10. The method according to claim 6, wherein cost values for the addressed location entities are derived from a cost database.

11. The method according to claim 1, wherein a next location entity is selected from the identified location entities by selecting the location entity with an associated replica number that is lower than the particular replica number associated to the location entity/entities to which a previous request was addressed.

12. The method according to claim 1, wherein the location entity is selected because of its associated cost value.

13. The method according to claim 1, further comprising
   selecting from the identified location entities at least one most preferred location entity, and
   addressing the document related request to each most preferred location entity.

14. The method according to claim 12, wherein each most preferred location entity is selected according to said each most preferred location entity's distance from a retrieving location entity.

15. The method according to claim 13, wherein a distance of a location entity is derived from the associated entity identifier.

16. The method according to claim 13, wherein a second preferred location entity is selected from the set of identified location entities according to its distance from the retrieving location entity, wherein a closest distance is derived from the associated entity identifier.

17. A non-transitory storage medium comprising computer program code which, when loaded in a processor unit of a computing entity, configures the processor unit to perform a method for retrieving an electronic document in a computer network, said method comprising steps of:
   determining a document identifier for the electronic document to be retrieved, wherein said electronic document has k=N replicas stored throughout the computer network, wherein N is a maximum number of replicas;
   wherein replicas are stored in ascending order of replica numbers at addresses predefined by a function which provides, for each replica number per electronic document, an address associated to a location entity where the replica can be found or can be stored;
   identifying the location entities where the replica for the electronic document might be stored by using a hash function that employs the replica number and the document identifier as input, wherein said hash function must be the hash function that was used to store the replicas of said electronic document; and
   performing iteratively (i=i+1) for each for each identified location entity until the replica is located:
      addressing a document related request to location entity (i), wherein location entity (i) has a set of replica numbers associated with it;
      receiving a positive response, indicating that the replica was located at location entity (i) for a particular replica number; and
      when receiving a negative response, indicating that there is no replica stored at location entity (i) for the particular replica number:
         setting the particular replica number associated with location entity (i) as an upper limit for a new set of replica numbers associated with a next location entity (location entity (i+1)) to be addressed with the document related request, wherein the new set of replica numbers represent lower replica numbers than the particular replica number that returned the negative response.

18. A computing entity for retrieving an electronic document in a computer network, comprising a processor unit configured to perform:
- determining a document identifier for the electronic document to be retrieved, wherein said electronic document has k=N replicas stored throughout the computer network, wherein N is a maximum number of replicas;
- wherein replicas are stored in ascending order of replica numbers at addresses predefined by a function which provides, for each replica number per electronic document, an address associated to a location entity where the replica can be found or can be stored;
- identifying the location entities where the replica for the electronic document might be stored by using a hash function that employs the replica number and the document identifier as input, wherein said hash function must be the hash function that was used to store the replicas of said electronic document; and
- performing iteratively (i=i+1) for each for each identified location entity until the replica is located:
  - addressing a document related request to location entity (i), wherein location entity (i) has a set of replica numbers associated with it;
  - receiving a positive response, indicating that the replica was located at location entity (i) for a particular replica number; and
  - when receiving a negative response, indicating that there is no replica stored at location entity (i) for the particular replica number:
    - setting the particular replica number associated with location entity (i) as an upper limit for a new set of replica numbers associated with a next location entity (location entity (i+1)) to be addressed with the document related request, wherein the new set of replica numbers represent lower replica numbers than the particular replica number that returned the negative response.

19. A computing entity for depositing a replica of an electronic document in a computer network, comprising a control unit designed to perform:
- assigning a document identifier for the electronic document to be deposited, wherein said electronic document has k=N replicas stored throughout the computer network, wherein N is a maximum number of replicas;
- storing replicas in ascending order of replica numbers at addresses predefined by a function which provides, for each replica number per electronic document, an address associated to a location entity where the replica can be stored; and
- identifying the location entities where the replica for the electronic document will be stored by using a hash function that employs the replica number and the document identifier as input, wherein said hash function must be the hash function to use in order to retrieve the replicas of said electronic document,
- performing iteratively (i=i+1) for each for each identified location entity until the replica is located:
  - addressing a document related request to location entity (i), wherein location entity (i) has a set of replica numbers associated with it;
  - receiving a positive response, indicating that the replica was located at location entity (i) for a particular replica number; and
  - when receiving a negative response, indicating that there is no replica stored at location entity (i) for the particular replica number:
    - setting the particular replica number associated with location entity (i) as an upper limit for a new set of replica numbers associated with a next location entity (location entity (i+1)) to be addressed with the document related request, wherein the new set of replica numbers represent lower replica numbers than the particular replica number that returned the negative response.

20. An article of manufacture comprising a non-transitory computer usable medium having computer readable program code embodied therein for causing retrieval of an electronic document in a computer network, the computer readable program code means in said article of manufacture comprising computer readable program code means for causing a computer to perform:
- determining a document identifier for the electronic document to be retrieved, wherein said electronic document has k=N replicas stored throughout the computer network, wherein N is a maximum number of replicas;
- wherein replicas are stored in ascending order of replica numbers at addresses predefined by a function which provides, for each replica number per electronic document, an address associated to a location entity where the replica can be found or can be stored;
- identifying the location entities where the replica for the electronic document might be stored by using a hash function that employs the replica number and the document identifier as input, wherein said hash function must be the hash function that was used to store the replicas of said electronic document; and
- performing iteratively (i=i+1) for each for each identified location entity until the replica is located:
  - addressing a document related request to location entity (i), wherein location entity (i) has a set of replica numbers associated with it;
  - receiving a positive response, indicating that the replica was located at location entity (i) for a particular replica number; and
  - when receiving a negative response, indicating that there is no replica stored at location entity (i) for the particular replica number:
    - setting the particular replica number associated with location entity (i) as an upper limit for a new set of replica numbers associated with a next location entity (location entity (i+1)) to be addressed with the document related request, wherein the new set of replica numbers represent lower replica numbers than the particular replica number that returned the negative response.

21. An apparatus to retrieve a replica of an electronic document in a computer network, said apparatus comprising:
- a processor performing: determining a document identifier for the electronic document to be retrieved, wherein said electronic document has k=N replicas stored throughout the computer network, wherein N is a maximum number of replicas;
- wherein replicas are stored in ascending order of replica numbers at addresses predefined by a function which provides, for each replica number per electronic document, an address associated to a location entity where the replica can be found or can be stored;
- identifying the location entities where the replica for the electronic document might be stored by using a hash function that employs the replica number and the document identifier as input, wherein said hash function must be the hash function that was used to store the replicas of said electronic document; and performing iteratively (i=i+1) for each identified location entity until the replica is located:
  addressing a document related request to location entity (i), wherein location entity (i) has a set of replica numbers associated with it;
  receiving a positive response, indicating that the replica was located at location entity (i) for a particular replica number; and
  when receiving a negative response, indicating that there is no replica stored at location entity (i) for the particular replica number:
    setting the particular replica number associated with location entity (i) as an upper limit for a new set of replica numbers associated with a next location entity (location entity (i+1)) to be addressed with the document related request, wherein the new set of replica numbers represent lower replica numbers than the particular replica number that returned the negative response.

22. The method of claim 5 wherein identifying the location entities further comprises:
  excluding a set of location entities associated with a high cost value.

23. The method of claim 1 wherein identifying the location entities further comprises:
  excluding a set of location entities associated with a network outage.

* * * * *